United States Patent [19]

Miura

[11] Patent Number: 5,339,260
[45] Date of Patent: Aug. 16, 1994

[54] APPARATUS FOR CHECKING SIZE OF A WORK

[75] Inventor: Kenji Miura, Fukuoka, Japan

[73] Assignee: RIX Corporation, Fukuoka, Japan

[21] Appl. No.: 872,898

[22] Filed: Apr. 23, 1992

[30] Foreign Application Priority Data

Apr. 23, 1991 [JP] Japan .................................. 3-122296

[51] Int. Cl.$^5$ ............................................. G01B 11/04
[52] U.S. Cl. ................................................... 364/560
[58] Field of Search ................ 364/561, 560; 250/560, 250/561, 563

[56] References Cited

U.S. PATENT DOCUMENTS

| | | | |
|---|---|---|---|
| 4,910,690 | 3/1990 | Fujita .................................. | 364/561 |
| 5,033,096 | 7/1991 | Morrison et al. ................... | 250/560 |
| 5,043,589 | 8/1991 | Smedt et al. ........................ | 250/561 |
| 5,146,101 | 9/1992 | Linker, Sr. et al. ................. | 250/561 |
| 5,162,866 | 11/1992 | Tomiya et al. ....................... | 250/561 |

*Primary Examiner*—Jack B. Harvey
*Assistant Examiner*—Thomas Peeso
*Attorney, Agent, or Firm*—Oliff & Berridge

[57] ABSTRACT

A size checking apparatus is employed to check sizes or dimensions of a work. The size checking apparatus includes: a constant speed transporting unit for a work; a measuring unit for continuously measuring a distance from a measurement sensor to a measuring position of the work while the work is being transported; a trigger signal generator for sensing that the work has passed and for commencing an acquisition of a measurement value by the measuring unit in response to a trigger signal; a pulse signal generator for generating a pulse signal in synchronism with the transportation of the work; an average value holding circuit for holding, in a time sequential mode during one cycle, an average value of the measurement value; an upper limit data holding circuit for holding an upper limit value; a lower limit value data holding circuit for holding a lower limit value; a calculation processing unit for setting an allowable range and for outputting a defect signal when the measurement value deviates from the allowable range; and a connection unit for a computer for setting the quantity of works to be measured, a measuring time period and a measuring number in the calculation processing unit, for setting the allowable range and for displaying the allowable range and the waveforms of the measurement values.

11 Claims, 6 Drawing Sheets

APPARATUS FOR CHECKING SIZE OF A WORK

BACKGROUND OF THE INVENTION

The invention generally relates to a work size checking apparatus capable of continuously checking the sizes of the works, depending upon special properties of the works. More specifically, the invention is directed to such a work size checking apparatus that an allowable range is set for size errors which have been precisely patterned based upon either a maximum value or a minimum value which are obtained by overwriting measurement values of a work or a standard model. Alternatively, the allowable range can be based on upper limit value and a lower limit value which are obtained by rearranging an average value of the measurement values by a standard deviation at an arbitrary measuring point. The allowable error range is then overwritten by actually measured values of a work for comparison purposes.

In an IC (integrated circuit) manufacturing process, a test is performed by checking the sizes of the heights of leads employed in the ICs. The ICs are not operable when the ICs, having incorrect heights of the leads, are mounted on printed circuit boards and loose contacts occur.

As the conventional size checking apparatuses, it has been proposed that the lead portions of an IC correctly positioned on a reference plane are imaged by a CCD camera. The image data acquired by the CCD camera are processed in a computer in order to check the conditions of the leads, and further heights of the leads of the IC which have been precisely positioned on a reference plane are measured as numerical values by employing a laser displacement gage.

However, these conventional size checking apparatuses have various problems. To achieve correct size judgments, the IC must be precisely positioned at a preselected location, therefore an apparatus for precisely positioning the IC is required. Furthermore, when this positioning apparatus is operated over a long time period, mechanical damage occurs, such as deformation and abrasion of various components. Correct size judgments are difficult to make, resulting in another problem. Additionally, it is a very cumbersome task to confirm how the positioning precision by the positioning apparatus is degraded and/or to what extent the restoring work has been carried out.

Also, in the conventional size checking apparatus, the allowable measurement range defined by the upper limit and the lower limit which have been set as a measure of allowable size errors is not preset based upon a large quantity of measurement values. For instance, it takes a large amount of measuring time to investigate whether or not the sizes of leads employed in an IC, that which are presently transported on the manufacturing belt line are within the allowable range. Since the ICs have specific structures that cannot be measured (e.g. leads located inside the IC housing), both the upper and lower limit judging standard values must be collected by re-checking the IC products which have been judged defective based on the design clearance.

Moreover, since the conventional size checking apparatus has a construction such both the upper limit value and the lower limit value, which are in conformity to a target fraction defect defined by the standard deviation or the like, cannot be simply set, the checking efficiency cannot be quickly increased.

The conventional size checking apparatus has a further problem that, because it is difficult to confirm which portions of leads the laser beam of the laser displacement gage is directed toward, a user may be afraid to rely on the checking results.

In addition, there is a further problem in that the positioning apparatus, the CCD camera, and the laser displacement gage must be of a high precision design so as to perform a zero point correction and to achieve the desired precision. As a result complicated and difficult adjustments are required.

SUMMARY OF THE INVENTION

The invention has been made to solve the above-described problems of the conventional size checking apparatus and, therefore, has as an object to provide a size checking apparatus for a work that is capable of eliminating the requirement for a precise positioning apparatus and for a zero-point correction, and is also capable of continuously checking sizes of works while they are being assembled on a production line. Furthermore, it is another object to provide such a size checking apparatus capable of setting of both an upper limit value, and a lower limit value which constitute an allowable range of a work size, based upon a standard deviation at an arbitrary measurement point of the work; capable of amending (e.g. by rearranging) a maximum value and a minimum value of actual measurements in order to be fitted to required values; and also capable of reliably and simply judging whether or not sizes of works are within the allowable range.

To achieve the above-described objects, one aspect of a work size checking apparatus according to the invention comprises: constant speed transporting means for transporting a work; measuring means for continuously measuring a distance from a measurement sensor to a measuring position on the work while the work is being transported along one direction whereby an output measurement value of the measuring means is an analog signal; trigger signal generating means for sensing that the work has passed and for commencing an acquisition of the output measurement value by the measuring means in response to a trigger signal; pulse signal generating means for generating a pulse signal in synchronism with the transportation of the work; an average value holding circuit for holding, in a time sequential mode during one cycle, an average value calculated from either a measurement value time-sequentially coincident with the pulse signal, or measurement values themselves to be averaged in synchronism with the pulse signal; an upper limit data holding circuit for holding an upper limit value which has been set by increasing/decreasing (e.g. according to a standard deviation) one cycle of a pedestal level of a maximum value obtained by time-sequentially acquiring only maximum values by comparing maximum values among previously obtained measurement values in synchronism with the pulse signal, or one cycle of the average value based upon a standard deviation at an arbitrary measurement point of the work, or the maximum measurement value as well as a minimum measurement value; a lower limit value data holding circuit for holding a lower limit value which has been set by increasing/decreasing one cycle of a pedestal level of a minimum value obtained by time-sequentially acquiring only the minimum values by comparing minimum values among previously obtained measurement values in synchronism with the pulse signal, or one cycle of the average value based upon a standard deviation at an arbitrary measurement point of the work, or the maximum value as well as the minimum value; a calculation processing unit for setting an allowable range which is formed by comparing the measurement value in synchronism with the pulse signal with the previously acquired measurement value to discriminate the maximum value from the minimum value, by a maximum value waveform based upon the maximum value and also a minimum value waveform based upon the minimum value, or by rearranging the maximum value waveform and the minimum value waveform, and for outputting a defective signal when the measurement value overwritten to (i.e. overlaid on) an allowable range formed by an upper limit waveform based on the upper limit value and also a lower limit waveform based on the lower limit value is deviated from the allowable range; and a connection unit for a computer, for setting a quantity of work measurement (i.e. the number of works to be measured), a measuring time period (i.e. the work cycle time), and a measuring number (i.e. the number of measurements to be read during the cycle) in the calculation processing unit, for setting a range for increasing/decreasing a pedestal level by an amount proportional to a standard deviation which has been obtained by all measurement values at the arbitrary measuring point of the work for correcting either the maximum value waveform and the minimum value waveform, or the average value waveform; and also for setting the allowable range and further for displaying the allowable range and the waveforms of the measurement values.

In an embodiment, when the measurement value is deviated from the allowable range in the calculation processing unit, it has a single mode for holding the measurement values so far acquired by the calculation processing unit and for stopping the measurements.

An embodiment of a work size checking apparatus of the invention is so arranged that a comparison area for one cycle in the calculation processing unit is subdivided into a plurality of areas, and also when the measurement value deviates from the allowable range of the area, a defective signal is produced.

In the work size checking apparatus according to the invention, either the work or the model which has been selected to set the allowable range during the checking operation is transported along one direction, and the trigger signal is produced by confirming that the work has passed. In response to the trigger signal, the measurement values of the distances from the measuring sensor to the checking position of the work, and also the pulse signals in synchronism with the transportation of the work, are successively acquired; the acquired values are compared with the measurement values previously acquired; and only the maximum value is selected so as to be time-sequentially stored in the upper limit data holding circuit for one cycle.

Furthermore, in the lower limit data holding circuit, comparisons are performed among the measurement values in synchronism with the pulse signal and the previously acquired measurement values, and only the minimum value is selected so as to be time-sequentially stored therein for one cycle. Also, in the average value holding circuit, such an average value, calculated by dividing all measurement values among the acquired measurement values of a plurality of works at every point for receiving the pulse signals, is time-sequentially stored for one cycle.

Further, the maximum value of the upper limit data holding circuit, the minimum value of the lower limit data holding circuit, and also the average value of the average value holding circuit are displayed by the display device. Then, at this time, a point where the maximum value is most separated from the minimum value, or an important point, is set; the standard deviation is obtained by processing the thus acquired measurement values in the computer; a value either twice or three times the standard deviation is set, whereby the upper limit value is stored in the upper limit data holding circuit instead of the maximum value and the lower limit value is stored in the lower limit data holding circuit instead of the minimum value. The allowable range of the size checking operation is set by correcting the required portions between the maximum value and the minimum value in a manual operation. Thereafter, the actually measured values of the shipping work are acquired by transporting the shipping work along one direction in a similar manner to the above-described work. Thus, the comparisons are carried out by the calculation processing unit whether or not the actually measured value is located within a range between the upper limit value and the lower limit value. If the actually measured value is outside the range between the upper limit value and the lower limit value, the defect signal is produced.

BRIEF DESCRIPTION OF THE DRAWINGS

For a better understanding of the invention, reference is made to the following description in conjunction with the accompanying drawings, in which.

DETAILED DESCRIPTION OF PREFERRED EMBODIMENTS

Figure 1:
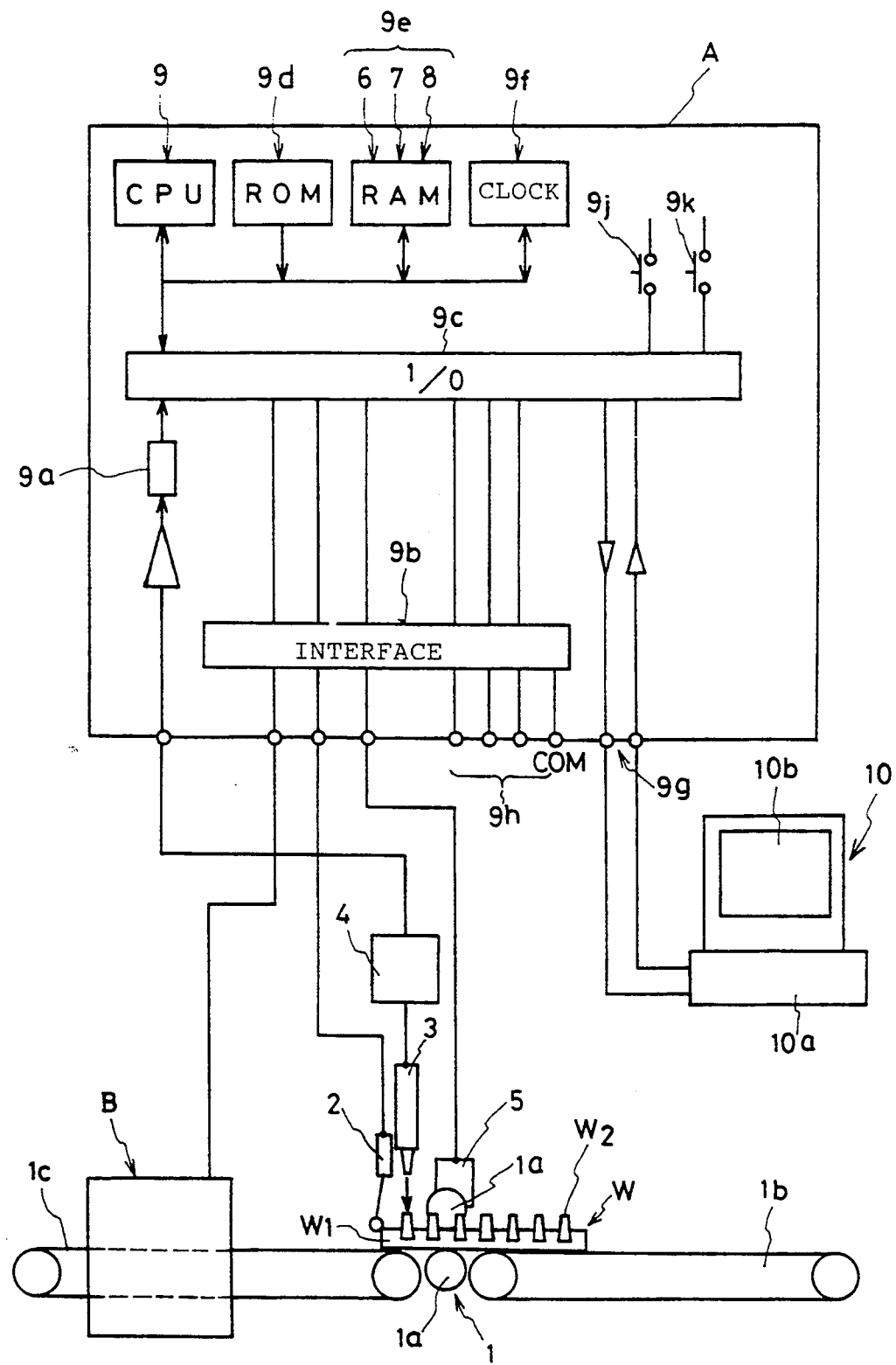
FIG. 1 is a schematic diagram for showing a size checking apparatus of an IC work according to a preferred embodiment of the invention.

Referring now to the drawings, preferred embodiments according to the invention will be described. It should be noted that a description is made of an apparatus for continuously performing a checking operation of lead heights of an IC (integrated circuit) work in this preferred embodiment.

Figure 2:
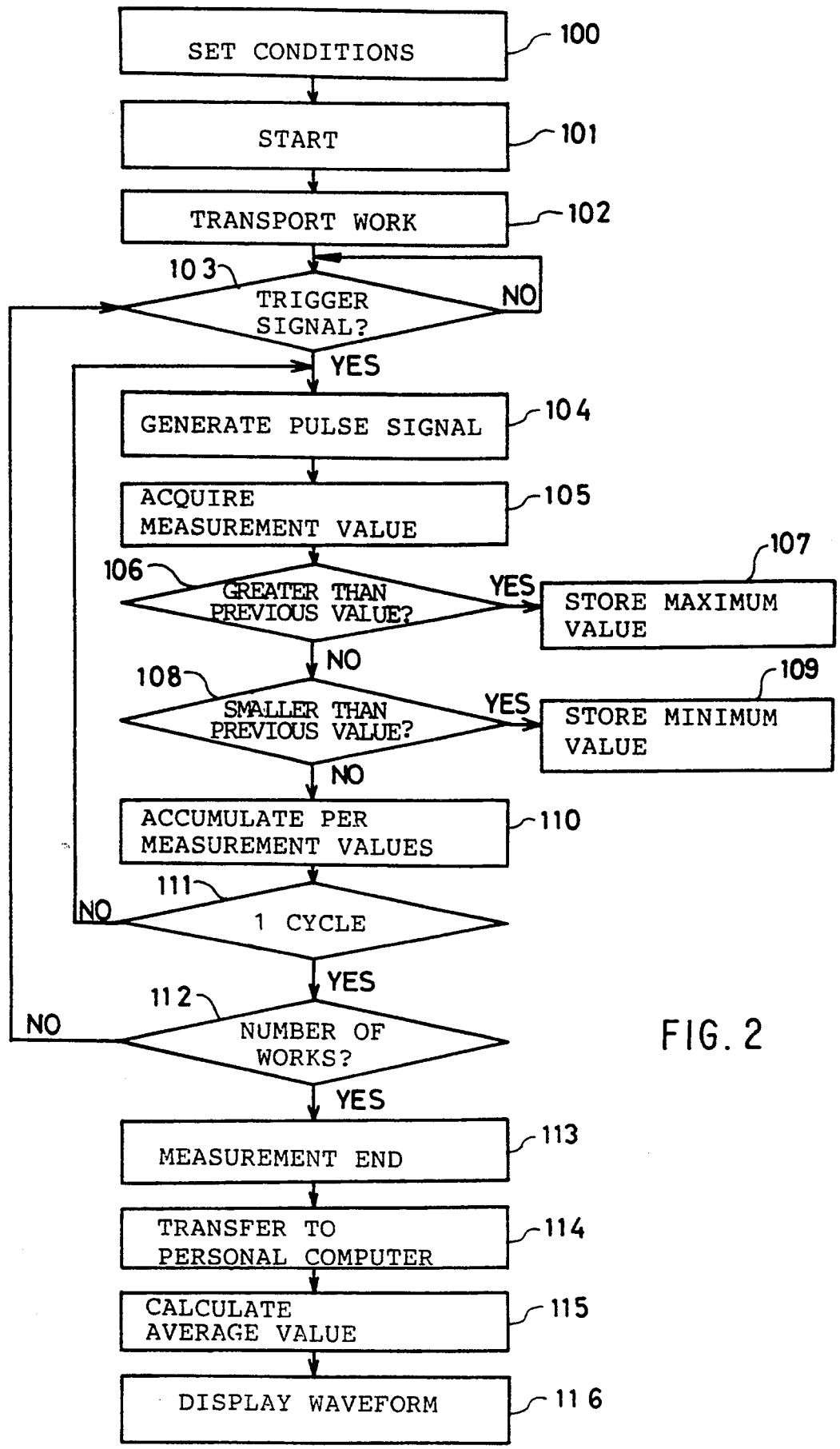
FIG. 2 is a flow chart for obtaining both of a maximum value and a minimum value for an allowable range in the size checking apparatus of FIG. 1.
Figure 3:
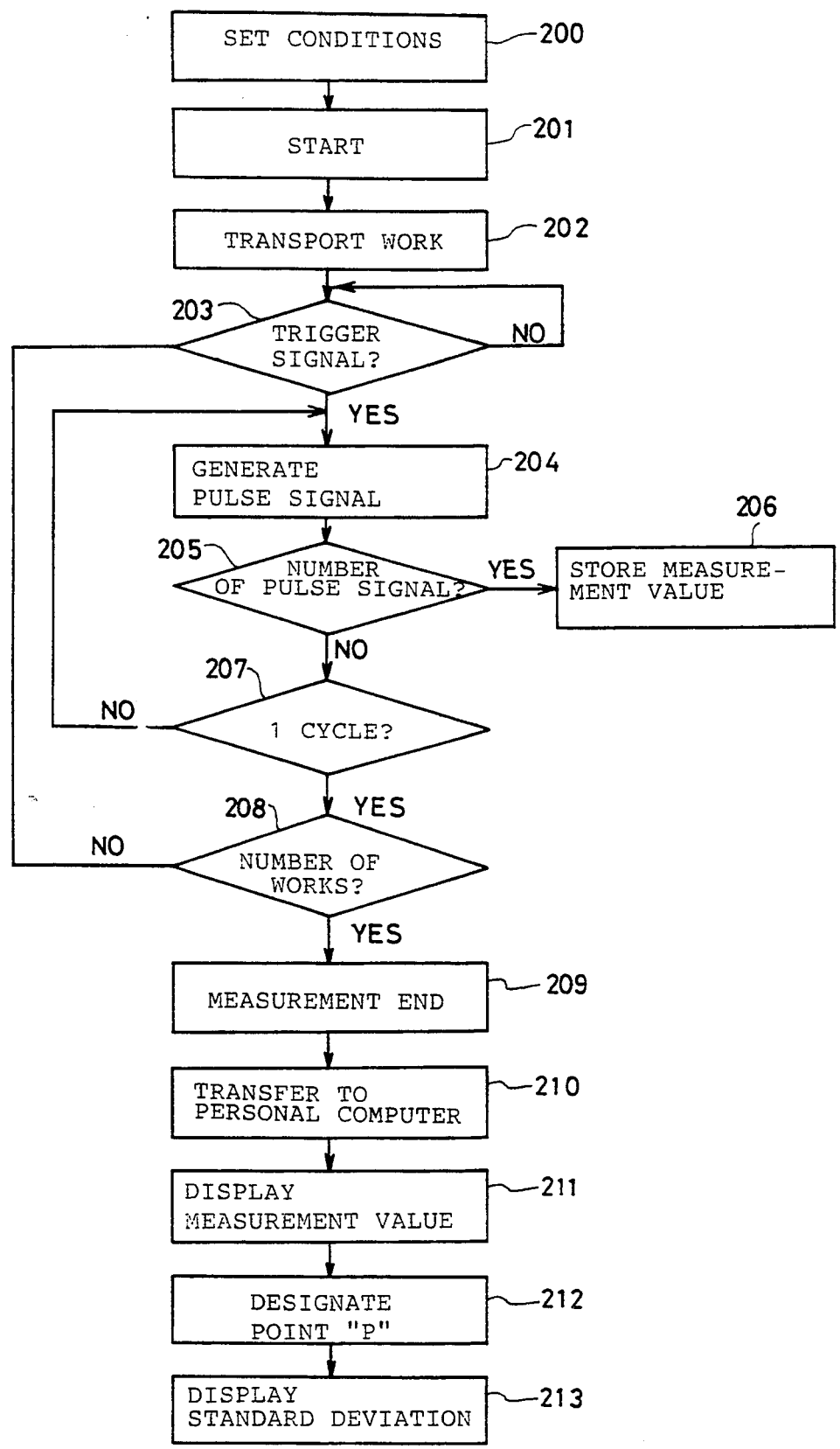
FIG. 3 is a flow chart for obtaining the standard deviation of all measurement values at a point, while the point is determined within a measurement range in the size checking apparatus of FIG. 1.
Figure 4:
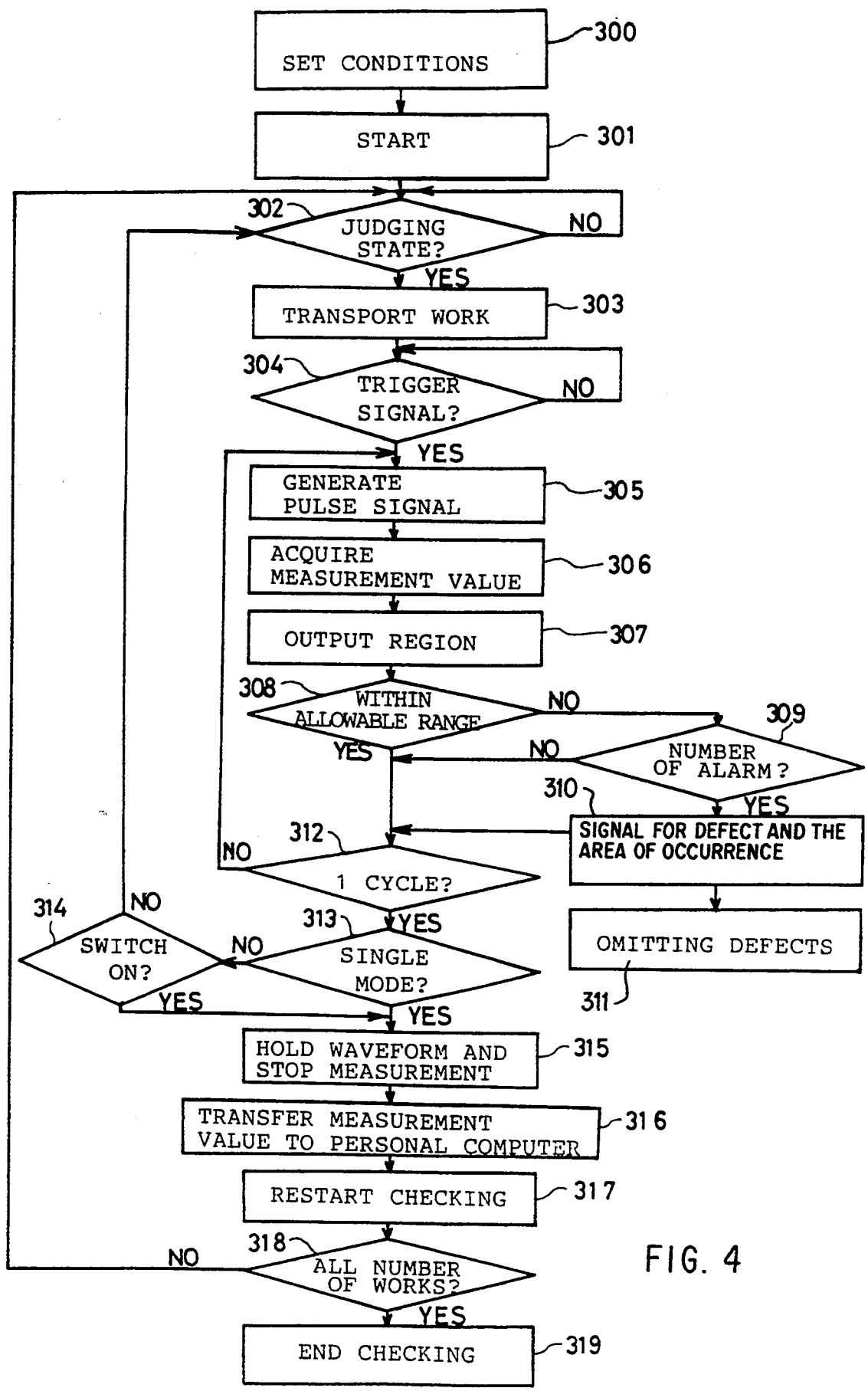
FIG. 4 is a flow chart for a size checking operation of a shipping work in the size checking apparatus of FIG. 1.
Figure 5:
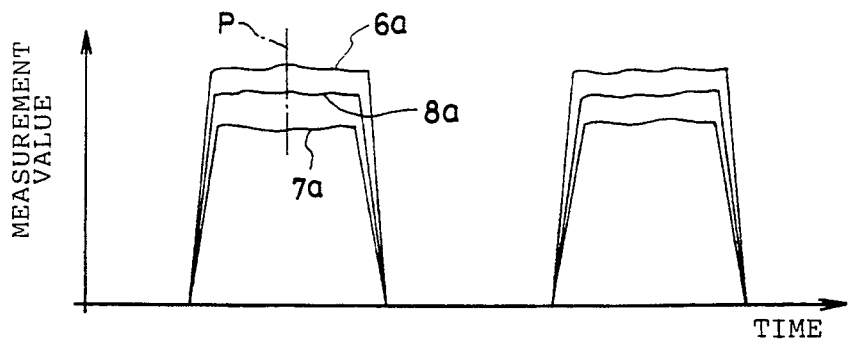
FIG. 5 is a pattern diagram of the maximum value, minimum value and average value.
Figure 6:
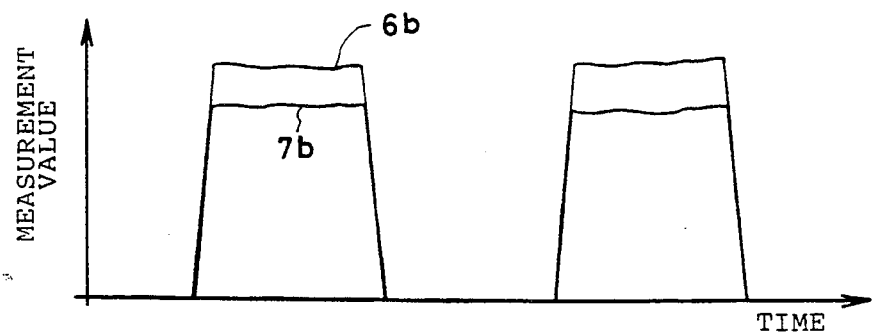
FIG. 6 is a pattern diagram of the upper limit value and the lower limit value obtained from the standard deviation of the point "P"
Figure 7:
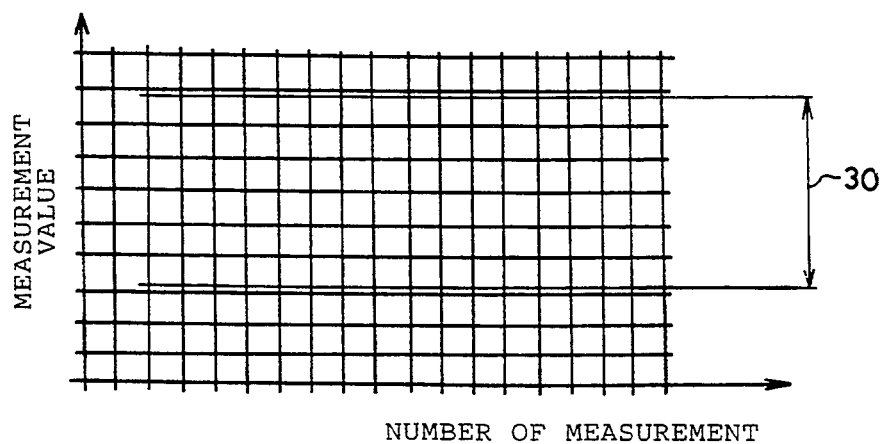
FIG. 7 is an explanatory diagram for showing fluctuation in the measurement values at the point "P"
Figure 8:
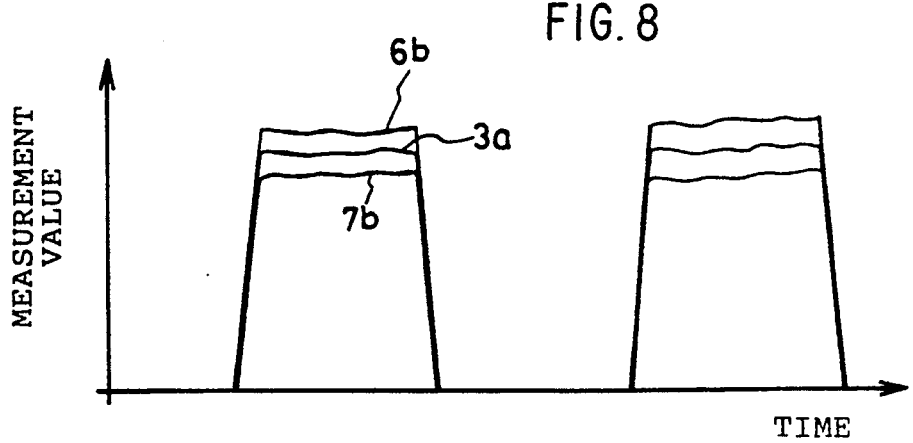
FIG. 8 is a pattern diagram in which the measurement values of the shipping IC work are overwritten.
Figure 9:
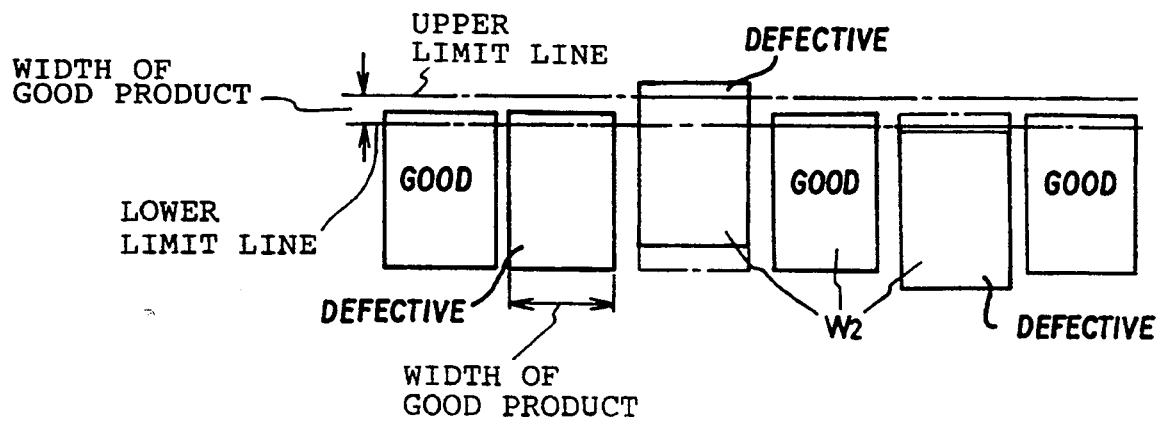
FIG. 9 schematically illustrates good/defective conditions of measurement portions.
Figure 10:
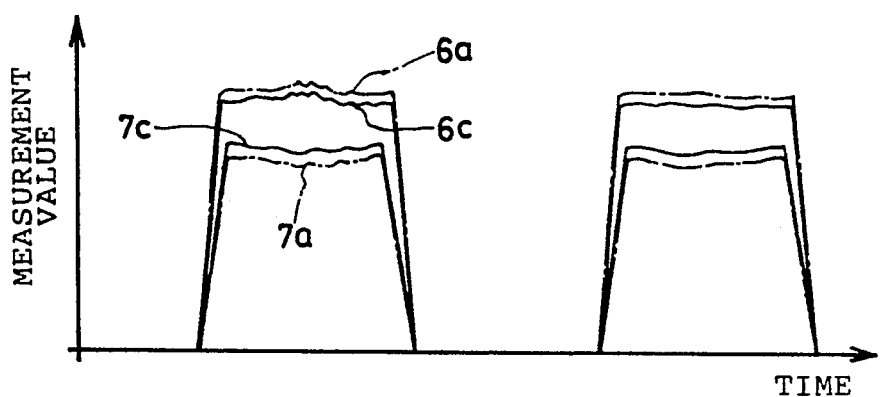
FIG. 10 is a pattern diagram for indicating the allowable range formed by increasing/decreasing the pedestal levels of the maximum value and the minimum value.

FIG. 1 is a schematic diagram showing a size checking apparatus of an IC work according to the preferred embodiments of the invention. FIG. 2 is a flow chart for obtaining both a maximum value and a minimum value for an allowable range. FIG. 3 is a flow chart for obtaining a standard deviation of all measurement values at a point while the point is determined within a measurement range in the size checking apparatus of FIG. 1. FIG. 4 is a flow chart for a size checking operation of a shipping work in the size checking apparatus of FIG. 1. FIG. 5 is a pattern diagram of the maximum value, minimum value and average value. FIG. 6 is a pattern diagram of the upper limit value and the lower limit value obtained from the standard deviation of the point "P". FIG. 7 is an explanatory diagram for showing fluctuation in the measurement values at the point "P". FIG. 8 is a pattern diagram in which the measurement values of the shipping IC work are overwritten. FIG. 9 schematically illustrates good/defective conditions of measurement portions. FIG. 10 is a pattern diagram for indicating the allowable range formed by increasing-/decreasing the pedestal levels of the maximum value and the minimum value.

In the size checking apparatus of the IC work, according to this preferred embodiment of the invention, there is provided a major arrangement constructed of a transportation apparatus 1 for an IC work "W"; a signal generator 2; a laser displacement sensor 3; an amplifier 4; a pulse generator 5; an upper limit data holding circuit 6; a lower limit data holding circuit 7; an average value holding circuit 8; a calculation processing unit (CPU) 9; a personal computer 10; and an omitting apparatus B for ejecting defective products. It should be noted that the above-described upper limit data holding circuit 6, the lower limit data holding circuit 7, the average value holding circuit 8 and the calculation processing unit 9 are combined with each other as a judging unit A.

The transportation apparatus 1 has a function to horizontally transport an IC (integrated circuit) work "W" along one direction at a predetermined speed. It is equipped with rollers $1a, 1a$, by which an upper surface and a lower surface of a package portion $W_1$ of the IC work W are sandwiched, and which are rotated at a constant velocity. In this drawing, reference numeral "$1b$" indicates a feed-in apparatus for the IC work "W" positioned within a midway of a production line and reference numeral "$1c$" represents a feed-out apparatus for the IC work "W". It should be noted that it is possible to employ a belt conveyor as the rollers $1a$.

The signal generator 2 corresponds to an external trigger signal generating means for generating an external trigger signal by detecting that the IC work "W" has passed and employs a limit switch, a non-contact (proximity) switch, an infrared sensor or the like.

The laser displacement sensor 3 corresponds to a measuring means for continuously measuring a distance from the laser displacement sensor to an upper edge of a lead "$W_2$" of this IC work W. In the preferred embodiment, such a laser displacement sensor is employed which is equipped with a small spot laser and also a measuring range from 5 to 10 mm in a full scale. There are provided two laser displacement sensors 3 positioned on both sides of the leads of the IC work "W" which are transported, and also two judging units "A".

The amplifier 4 converts a distance (a changing amount) to the upper edge of the lead "$W_2$" of the IC work "W", which has been measured by the laser displacement sensor 3, into a voltage value and outputs this voltage value. In this preferred embodiment, the amplifier 4 converts the changing amount into a signal ranging in value from 0 to 10 V.

The pulse generator 5 is a pulse generating means such that the start timing for acquiring the measurement values is controlled as is the synchronizing pulse corresponding to the timing pulse by which the measurement data is time sequentially stored for one cycle. These synchronizing pulses are generated in response to the relation angle of the roller $1a$ in the transportation apparatus 1.

The upper limit data holding circuit 6 time-sequentially stores only the maximum values which have been judged by the calculation processing unit 9 for the measurements taken during one cycle (corresponding to a length of one piece of IC work W). Also, the upper limit data holding circuit 6 stores the corrected values obtained by processing the maximum value, minimum value and average value or the upper limit values obtained by correcting only a required portion of an arbitrary allowable range within one cycle.

The lower limit data holding circuit 7 time-sequentially stores only the minimum values which have been judged by the calculation processing unit 9 for the measurements taken during one cycle in a similar manner to that of the upper limit data holding circuit 6. Also, this lower limit data holding circuit 7 stores the corrected values obtained by processing the maximum value, minimum value and average value or the lower value obtained by correcting only a required portion of an arbitrary allowable range within one cycle.

The average value holding circuit 8 stores time-sequentially the average value of the measured values at every pulse signal receiving point or the measurement values under measurement for one cycle.

The calculation processing unit 9 sends to the upper limit data holding circuit 6 only the maximum values obtained by comparing the measurement values acquired during a measurement cycle with the previously acquired measurement values; delivers only the minimum values to the lower limit data holding circuit 7 so as to be stored therein; accumulates all measurement values, thereby storing the accumulated values and calculated average values in the average value holding circuit; and judges whether or not the IC product is defective by comparing the sizes of the leads of the IC (product) with an arbitrary allowable range set from the below-mentioned allowable range in accordance with the measurement contents of the shipping IC work "W". Any one of the following allowable ranges is set by the personal computer 10. That is to say, the time-sequentially allowable ranges may be formed by the maximum value waveform $6a$ (in FIG. 5) of the upper limit data holding circuit 6 and also the minimum value waveform $7a$ (in FIG. 5) of the lower limit data holding circuit 7.

Also, in the allowable range between the above-described maximum value waveform $6a$ and minimum value waveform $7a$, such an allowable range may be defined such that the average value of the average value circuit 8 is increased by "$3\sigma$" to obtain an upper limit value $6b$ (in FIG. 6) based on the standard deviation "$\sigma$" which has been obtained at the widest portion between the maximum waveform $6a$ and the minimum waveform 7a or the important size portion, and this average value is decreased by "3σ" to obtain a lower limit value 7b (in FIG. 6).

An allowable range is defined by increasing/decreasing the maximum value waveform 6a and the minimum value waveform 7a, or the average value waveform 8a by a function of the average value of the average value holding circuit 8.

The above-described allowable ranges are such that a monitor region is set by subdividing one cycle into a plurality of cycles (8 areas in this preferred embodiment).

Then, this calculation processing unit 9 derives such outputs that a defective product indication is produced during the defective product judging operation, and also in which region (i.e. area of the plurality of cycles) the defective product indication is produced; holds the measurement values of this defective product indication for one work (one cycle) and then stops; and has both a single mode, in which the checking operation is restarted after the measurement value of the defective product has been transferred to the computer 10, and a repeat mode in which the checking operation is continuously performed without holding the measurement data, although both the region output indicating in which region the defective product indication is produced and the judgment output of the defective product are derived therefrom. Then, when the defective product indication is sensed, the omitting apparatus B is operated in response to the judgment output of the defective product indication, and thus the defective IC work is ejected from the IC production line.

In FIG. 1, reference numeral 9a indicates an A/D converter; reference numeral 9b denotes an interface; reference numeral 9c represents an I/O (input/output); reference numeral 9d shows a ROM for storing the software used by the judging unit and the software used to process analog values; reference numeral 9e denotes a RAM comprising the above-described upper limit data holding circuit 6, lower limit data holding circuit 7, and average value holding circuit 8; reference numeral 9f is a clock; reference numeral 9g shows a communication connection unit with the computer 10; reference numeral 9h indicates an area output unit connected to an alarm lamp; reference numeral 9j represents a measurement start button; and reference numeral 9k is a reset switch for continuing the measurement.

The computer 10 is a personal computer for calculating the standard deviation for setting the allowable range in the calculation processing unit 9 and for displaying various waveforms and the measurement value waveforms of the shipping IC work W. The personal computer 10 is equipped with a CRT 10b as a display unit and a keyboard at a main body 10a thereof. The main body 10a of the personal computer 10 is connected to the connection unit 9g of the judging unit A via the exclusive communication line. The personal computer 10 has various functions such as setting the overwriting number (namely, the quantity of IC works to be used to form the allowable range which are transported by the transportation apparatus 1) that is set as the measuring number; setting the measured length of one IC lead as a measured quantity for one cycle; setting the timing for acquiring the measured values (one measurement per 1/500 seconds in the preferred embodiment); setting the starting timing for acquiring the data in synchronism with the external trigger signal generated by sensing that the IC work W has passed; and also setting the resolution (1/4096 in the preferred embodiment) by the scale of the input signal (a full scale of 0 to 10 V in the preferred embodiment). Further, according to the functions of the personal computer 10, the standard deviation "σ" is calculated from all of the measurement values at an arbitrary point where the range between the maximum value waveform 6a and the minimum value waveform 7a is at its widest maximum value; a section three-times larger than this range is set as the allowable range of the calculation processing unit 9; a selection is made of any one of the maximum value waveform 6a, the minimum value waveform 7a, and the average value waveform 8a, and then the selected value is increased to set the upper limit value, whereas the selected value is similarly decreased to set the lower limit value. In addition, the personal computer 10 is equipped with functions that any one of these allowable ranges may be selected; a portion of the selected allowable range for one cycle is divided into a plurality of areas and then only a predetermined area is set to be a defect judging area; the number is set by which a defect can be judged if the measured values deviate from the upper and lower limit values; and also the measurement mode is selected to be either a single mode or a repeat mode.

Referring now to the flow charts, operation of the preferred embodiment will be described.

First, the display operations of the maximum value waveform 6a, minimum value waveform 7a and average value waveform 8a are performed in the overwrite mode, whereby fluctuation and reproducibility of the lead heights of the IC work W are confirmed (refer to FIG. 2).

The number of rewriting operations (number of products checked by the size checking apparatus) is set by the computer 10 as the number of measurement cycles; the measured lengths of the leads of a single IC are set as the data numbers for one cycle; as the data acquisition timing, one piece of data is set every 1/500 of a second; the data acquisition commencement is set upon the externally supplied work pass confirmation signal; the input signal is set to 0 to 10 V in a full scale; and the resolution is selected to be 1/4096 (step 100).

When the start button 9j is turned ON (step 101), the IC works W are successively transported one by one by the transportation apparatus 1 (step 102). The signal generator 2 confirms that the external trigger signal generated by sensing that an IC work W has passed, is inputted (step 103), whereas the pulse generator 5 generates one pulse signal every time the IC work W is moved by 20 μm (step 104). In synchronism with the above-described pulse signal, the change amount derived from the laser displacement sensor 3 is acquired via the amplifier 4 and passed to the judging unit A as an analog amount (step 105).

In the calculation processing unit 9 of the judging unit A, a judgment is made whether the present measurement value is greater than the stored measurement value stored in the upper limit data holding circuit 6 after the previous comparison for the measurement portion (step 106). If so, the greater measurement value is stored in the upper limit data holding circuit 6 in a time sequential manner, that is, for each measurement position or point (step 107). Then a judgment is made whether the present measurement value is smaller than the stored measurement value in the lower limit data holding circuit 7 after the previous comparison for that measurement position (step 108). If so, the smaller measurement value is stored in the lower limit data holding circuit 7 in the time sequential mode (step 109). The measurement values acquired at each measuring point are accumulated and stored in the average value holding circuit 8 (step 110). A further judgment is performed to ascertain whether the measurement has been completed up to the preset number of measurement values (one cycle time period during which one piece of IC work W is measured) (step 111). If the measurement is accomplished, a check is made whether the measurement number reaches the preset measurement number (number of IC works to be measured or measurement cycles) (step 112). If the measurement number has reached the preset measurement number, then the measurement operation is ended (step 113). Thereafter, the measurement values are transferred to the computer 10 (step 114). During this transfer operation, the respective accumulated values for each measurement position stored at the step 110 are divided by the measurement number (number of cycles), thereby obtaining an average value for each measurement position which will then be transferred to the computer 10 (step 115). With these measurement values, the waveform line 6a formed by only the maximum values collected at the step 107, the waveform line 7a formed by only the minimum value collected at the step 109, and also the waveform line 8a formed by only the average values obtained at the step 115 are simultaneously displayed by three different colored lines. It should be noted that these waveforms may be recorded by way of a recording means for performance comparison purposes.

Next, an arbitrary point is designated in the waveform, and a distribution diagram of the measurement values as well as standard deviation "$\sigma$" are obtained by using only the values at this measurement position or point (see FIG. 3, 5 to 7).

The point at which the respective waveforms are overwritten on the CRT where the fluctuation in the measurement values at the respective waveforms is desired to be known, and the quantity of IC works to be measured are set as the cycle number by the computer (step 200).

When the start button 9j is tuned ON (step 201), the IC works W are successively transported one by one by the transportation apparatus I (step 202). The signal generator 2 confirms that the external trigger signal generated by sensing that the IC work W has passed, is inputted (step 203), whereas the pulse generator 5 generates one pulse signal every time the IC work W is moved by 20 $\mu$m (step 204) While the measurement values at the set points or measurement positions are acquired, this pulse is generated until the number of the pulse reaches the required quantity set as the point at the previous step 200 (step 205), and then a predetermined number of measurement values are stored (step 206). Then, confirmation is made whether the measurement has been accomplished up to a preset number of measurement values (one cycle time during which a single IC work is measured) (step 207), and then the measurement is carried out until it reaches the preset measurement number (the number of IC works to be measured) (step 208).

When the measurement number reaches the preset measurement number, the measurement is ended (step (209), the measurement values are transferred to the computer 10 (step (210), the measurement values at the points preset in the respective cycle orders are displayed on the abscissa of the CRT screen. If required, these measurement values are enlarged on the CRT screen in order to be confirmed (step 211). Then, a range in which the fluctuation and standard deviation in the measurement values are wanted to be checked, is set among the ranges from the first cycle to the present cycle (step 212), and then only the measurement values of the designated point P (see FIG. 5) are collected in the respective cycles of the preset cycle number, so that both the standard deviation "$\sigma$" and fluctuation are graphically represented (step 213).

Subsequently, based upon the overwriting operation of the above-described measurement values, the fluctuation, and the standard deviation "$\sigma$", the average value waveform 8a is increased/decreased by "$3\sigma$" to draw the upper limit line and the lower limit line, whereby a judgment is made whether an IC work is defective or good (see FIGS. 4, 6, 8 and 9).

Alternatively, any one of the following allowable ranges can be set by the computer 10. That is to say, these allowable ranges are an allowable range formed by the maximum value waveform 6a and the minimum value waveform 7a, otherwise an allowable range is defined as follows. The maximum value waveform, minimum value waveform, average value waveform are drawn on the CRT screen. Then, one of three waveform lines is selected, and the automatically selected line is increased based upon the equation of $Y=AX+B$ to set the upper limit value. Similarly, any one of the maximum value waveform, minimum value waveform, average value waveform is selected, and then the automatically selected line is decreased based on the equation of $Y=AX+B$ to set the lower limit value. Furthermore, an allowable range is set by providing a section three times greater than the standard deviation "$\sigma$".

As to such a portion which is not required to judge whether an IC work is good or defective with the upper limit value and the lower limit value, and such a portion which is not required by more severe judgment, a region is set by manual mode and a point is made, whereby an allowable range is defined by setting the upper limit value and the lower limit value. If it is necessary to store the data of the IC work during the defective judgment operation, the operation mode is set to the single mode. Even equal or unequal, the measurement region is subdivided into 8 regions at maximum by drawing the slit lines for the region output. The number is set for judging whether the defective product is made if the measurement values are deviated from the upper limit value and the lower limit value (step 300) within each region.

After confirmation is made that the judging unit A is brought into such a condition under which a judgment can be done whether the checked product is good or defective (step 302) by turning on the start button 9j (step 301), the IC works "W" are successively started to be conveyed by the transportation apparatus 1 (step 303). After confirmation is established that the external trigger signal generated by the signal generator 2 by sensing that the IC work W has passed, has been inputted (step 304), the pulse generator 5 generates one pulse every time the IC work W is moved by 20 $\mu$m (step 305). In synchronism with the pulse signal, the change amount derived from the laser displacement sensor 3 is acquired via the amplifier 4 as an analog amount by the judging unit A (step 306). When it enters into the previously set region, the region judgment output is produced (step 307). Then, a judgment is made whether the measurement value is located within the upper limit value and the lower limit value, which have been set by the calculation processing unit 9 (step 308). If the measurement value is not located therein, when it reaches an alarm number (step 309), both the defective product producing signal and the producing region judging signal are outputted (step 310), and also the defective product is dropped out or marked (step 311).

If the measurement value is located within the upper limit value and the lower limit value at the step 308, after the measurement is carried out up to the preset measuring number (one cycle time during which a single IC work W is measured) (step 312), the judging unit holds the waveform for one cycle and stops its operation (step 315) in case that the checking operation mode of the calculation processing unit 9 is in the single mode (step 313). Then, the data about the defective product is transferred to the computer 10 so as to be stored therein (step 316), and the checking operation is commenced (step 317). This checking operation is continued until all of the IC works to be checked have been checked (step 318), whereby the checking operation is accomplished (step 319). At the step 313, if the checking operation mode is the repeat mode, the checking operation is continued (step 314). When the reset switch 9k is turned on, the waveform for one cycle is stored and the checking operation is stopped (step 315), whereas when the reset switch 9k is turned off, the judging unit is returned to such a state just after the start button is turned on.

It should be noted that FIG. 10 is a pattern diagram for showing the allowable range set by correcting the maximum value waveform 6a and the minimum value waveform 7a; a waveform 6c is formed by decreasing the maximum value waveform 6a; and a waveform 7c is produced by increasing the minimum value waveform 7a.

As previously explained in detail, in accordance with this preferred embodiment, the IC work equivalent to the shipping IC work is measured, the measurement values are overwritten in the time sequential mode, whereby the overwritten measurement values are compared with the patterned waveforms in order to check the sizes of the shipping IC work. As a consequence, the measurement values are continuously acquired under the same measurement condition to perform the correct size checking operation without providing the precise positioning apparatus, or continuously performing the zero-point adjustment under severe condition. Accordingly, the size checking apparatus can be manufactured at lower cost, as compared with the conventional size checking apparatus. Furthermore, the spotting condition of the laser light can be recognized by observing the waveforms displayed on CRT. Since the IC works "W" are measured while being transported, the lengthy setting time for performing the measurement operation is no longer required, and also the measuring operation can be carried out under such a condition that this size checking apparatus has been assembled.

Also, even when a curved portion is measured, since a correct pattern thereof can be readily formed, the size checking operation can be correctly carried out.

Further, the changing conditions of the overall size checking apparatus and also the recovery degrees after the periodic maintenance thereof may be judged by comparing the past judging waveform with the present judging waveform.

Moreover, since both the upper limit value and the lower limit value, which constitute the allowable range for the sizes or dimensions can be set based upon the standard deviation obtained by arbitrarily determining the lead portion with the measurement values having great fluctuation, the lead portion expanding in upper and lower directions, and also the lead portion size being very important, the size checking operation of the IC work can be realized by setting the sizes concerning the overall IC work within the reasonable allowable range.

In addition, since the waveforms employed in the size checking operation may be formed by using the maximum value waveforms and minimum value waveforms for the acquired measurement values; by employing the upper limit value waveform and the lower limit value waveform produced by transferring the average value waveform 8a along the upper and lower directions by $2\sigma$ or $3\sigma$ of the standard deviation at the arbitrary point; or by combining these waveforms with each other, the size checking operation matched with the work can be carried out. In this case, since the defective ratio may be previously set, a quality control may be freely executed.

As the waveform formed by the average value is displayed in the waveforms, an eccentric degree in sizes of an IC work may be judged. Also changes in the size checking apparatus per se may be determined by measuring the same model several times.

Then, since a defective monitoring area is set, it can be immediately judged in which area a defect happens to occur. In case of the single mode, the data on the defective product can be immediately processed, although a large quantity of works are checked, under which a defect happens to occur.

While the size checking apparatus according to the preferred embodiment of the invention has been described, the invention is not limited only to this preferred embodiment, but may be changed, modified or substituted without departing from the technical spirit and scope of the invention.

For instance, although the work to be checked is the IC work in this preferred embodiment, other works may be freely checked such as electronic components other than IC, mechanical parts, sizes or dimensions of parts or contents stored within a vessel, sizes or shapes of articles under process.

Although the above description has been made that the transportation apparatus horizontally transports the IC work in one direction in the preferred embodiment, the invention is not limited thereto, but an inverting mechanism may be employed by which a work is rotated in the horizontal direction during the transportation. In this case, such an IC having leads along not only in the horizontal direction but also in the vertical direction may be simply checked by further employing the laser displacement sensor 3. Also, a plurality of such transportation apparatuses matched with shapes of works may be prepared and substituted, depending upon the shapes of the works.

Also, the computer 10 is equipped with the display CRT 106 in the above-described preferred embodiment. The invention is not restricted to this embodiment. Either the computer or the CRT may be assembled within the judging unit. Further, both the computer and the CRT may be commonly used with other judging units.

The pulse signal used to synchronize the measurement values may be derived from the clock 9f.

Although the trigger signal used is from the external signal source, changes in the acquired analog values may be used as an internal trigger signal. Both the external trigger signal and the internal trigger signal may be combined with each other.

As previously described, since the work equivalent to the shipping work is measured, and the resultant measurement values are time-sequentially overwritten so as to be compared with the patterned waveforms, so that the sizes of the shipping work are checked in the work size checking apparatus according to the invention, the correct size checking operations can be performed by continuously acquiring the measurement values under the same condition without employing the conventional precise positioning apparatus and also without executing the severe zero-point adjustment. As a consequence, the size checking apparatus can be manufactured at low cost. Also, since the measurement is performed while the work is transported and the checking apparatus is assembled within the production line, the size measurement of the work may be carried out during the line transportation. Since the allowable range is patterned based on the acquired measurement values, the simple measurement may be achieved even if the checking surface has concave and convex portions, and also curved portions. The changing degree in the overall size checking apparatus, and also the recovery degree after repairing operation may be recognized by comparing the past judging waveform with the present judging waveform.

Also, since the upper and lower limit values of the allowable range may be set by increasing and decreasing the average value waveform based on the standard deviation "$\sigma$" of an arbitrarily defined point, and also an overall range may be increased/decreased by the equation of $Y=AX+B$, the size checking operation may be carried out by setting the sizes of the overall work into the acceptable allowable range. Since the maximum value waveform produced by only the maximum values of the measurement values, the minimum value waveform, produced by only the minimum values therein, or the average values may be used in the size checking operation, the size checking operation matched to the work may be rationally performed by properly employing these waveforms. Then, as the defective ratio is preset, the quality control may be freely carried out.

Furthermore, since the measurement values which have been acquired before the defective work happens to occur are stored and the size measurement is interrupted, the data about the defective product may be immediately analyzed, even if no one knows when such a defective product happens to occur.

Since the defect monitoring area is set, there are particular advantages in that it can be quickly checked to determine at which area the defect happens to occur, and also the data in the defective product can be immediately investigated.

What is claimed is:

1. A size checking apparatus for a work, comprising:
  constant speed transporting means for the work;
  measuring means for continuously measuring a distance from a measurement sensor to a measuring position on the work while the work is being transported along one direction, an output measuring value of the measurement means being an analog signal;
  trigger signal generating means for sensing that the work has passed and for commencing an acquisition of the output measurement value by the measuring means in response to a trigger signal;
  pulse signal generating means for generating a pulse signal in synchronism with the transportation of the work;
  an average value holding circuit for holding in a time sequential mode during one cycle, an average value calculated from either a measurement value time-sequentially coincident with the pulse signal, or measurement values with each other in synchronism with the pulse signal;
  an upper limit data holding circuit for holding an upper limit value which has been set by increasing-/decreasing one cycle of a pedestal level of a maximum value obtained by time-sequentially acquiring only maximum values among previously obtained measurement values in synchronism with the pulse signal, or one cycle of the average value based upon standard deviation at an arbitrary measurement point of the work, or the maximum value as well as a minimum value;
  a lower limit value data holding circuit for holding a lower limit value which has been set by increasing-/decreasing one cycle of a pedestal level of a minimum value obtained by time-sequentially acquiring only the minimum values by comparing minimum values among previously obtained measurement values in synchronism with the pulse signal, or one cycle of the average value based upon standard deviation at an arbitrary measurement point of the work or the maximum value as well as the minimum value;
  a calculation processing unit for setting an allowable range which is formed by comparing the output measurement value in synchronism with the pulse signal with the previously acquired output measurement value to discriminate the maximum value from the minimum value, by a maximum value waveform based upon the maximum value and also a minimum value waveform based upon the minimum value, or by rearranging the maximum value waveform and the minimum value waveform, and for outputting a defect signal when the measurement value overwritten to an allowable range formed by an upper limit waveform based on the upper limit value and also a lower limit waveform based on the lower limit value is deviated from the allowable range; and
  a connection unit for a computer, for setting a quantity of works to be measured, a measuring time period, and a measuring number in the calculation processing unit, for setting a range for increasing-/decreasing a pedestal level by a standard deviation which has been obtained by all measurement values at the arbitrary measuring point of the work, for setting the allowable range and further for displaying the allowable range and the waveforms of the measurement values.

2. A size checking apparatus as claimed in claim 1, wherein when the measurement value is deviated from the allowable range in the calculation processing unit, it has a single mode for holding the measurement values so far acquired by the calculation processing unit and for stopping the measurements.

3. A size checking apparatus as claimed in claim 1, wherein a comparison area for one cycle in the calculation processing unit is subdivided into a plurality of areas, and also when the measurement value is deviated from an allowable range of the area, a defect signal is produced.

4. A size checking apparatus for a work, comprising:

constant speed transporting means for the work;

measuring means for continuously measuring a distance from a measurement sensor to a measuring position on the work while the work is being transported along one direction, an output measuring value of the measurement means being an analog signal;

trigger signal generating means for sensing that the work has passed and for commencing a cycle for an acquisition of the output measurement value by the measuring means in response to a trigger signal;

pulse signal generating means for generating a pulse signal in synchronism with the transportation of the work;

an average value holding circuit for cumulating and holding a plurality of cumulative measurements, the plurality of cumulative measurements including a cumulative measurement corresponding to each respective pulse signal generated during the cycle, the cumulative measurement being a cumulation of sampled measurements beginning with a first measurement at a beginning of the cycle and ending with a last measurement at an end of the cycle, each of the sampled measurements being a sampled measurement based on the output measurement value sampled in synchronism with the respective pulse signal;

an upper limit data holding circuit for determining and holding a plurality of upper limit values, the plurality of upper limit values including one of a plurality of upper measured values and a plurality of upper defined values, each upper measured value and each upper defined value corresponding to a respective sampled measurement, an upper measured value corresponding to a first one of the plurality of upper limit values being the first measurement and an upper measured value corresponding to any second one of the plurality of upper limit values being a maximum value of the respective sampled measurement corresponding to the second one of the plurality of upper limit values and a sampled measurement corresponding to a third one of the plurality of upper measured values immediately preceeding the second one of the upper measured values, each of the plurality of upper defined values being defined externally to the upper limit holding circuit, the plurality of upper measured values constituting a measured maximum value waveform, the plurality of upper defined values constituting a corrected maximum value waveform;

a lower limit data holding circuit for determining and holding a plurality of lower limit values, the plurality of lower limit values including one of a plurality of lower measured values and a plurality of lower defined values, each lower measured value and each lower defined value corresponding to a respective sampled measurement, a lower measured value corresponding to a first one of the plurality of lower limit values being the first measurement and a lower measured value corresponding to any second one of the plurality of lower limit values being a minimum value of the respective sampled measurement corresponding to the second one of the plurality of lower limit values and a sampled measurement corresponding to a third one of the plurality of lower measured values immediately preceeding the second one of the lower measured values, each of the plurality of lower defined values being defined externally to the lower limit holding circuit, the plurality of lower measured values constituting a measured minimum value waveform, the plurality of lower defined values constituting a corrected minimum value waveform;

a calculation processing unit for setting an allowable range and for generating a defective work signal when the output measured value deviates from the allowable range, the allowable range being one of i) a range between the measured maximum value waveform and the measured minimum value waveform;

ii) a range between the corrected maximum value waveform and the corrected minimum value waveform; and computing means for reading data from and setting a plurality of parameters in the average value holding circuit, upper limit data holding circuit, lower limit data holding circuit and calculation processing unit, the computing means setting in the calculation processing unit a number of works to be measured, the cycle time and a number of measurements to be made during the cycle time, the computing means reading from the average value holding circuit the plurality of cumulative measurements and computing a corresponding plurality of cumulative average value measurements constituting an average value waveform, the computing means reading from the upper limit data holding circuit the plurality of upper measured values and from the lower limit data holding circuit the plurality of lower measured values and displaying to an operator the pluralities of cumulative average value measurements, upper measured values and lower measured values, the computing means computing a standard deviation based on a function of the plurality of cumulative measurements and an operator selectable point of measurement, the computing means computing the corrected maximum value waveform and the corrected minimum value waveform, the corrected maximum and minimum value waveforms being calculated based on a function of the standard deviation and one of the measured maximum value waveform, the measured minimum value waveform and the average value waveform, the computing means setting in the upper limit data holding circuit and the lower limit data holding circuit the upper defined values and the lower defined values, respectively, according to an operator selected mode.

5. The size checking apparatus of claim 4, wherein the computing means further sets a single mode parameter in the calculation processing unit, the single mode parameter causing the calculation processing unit to stop processing new sampled measurements when a measured value deviates from the allowable range.

6. The size checking apparatus of claim 4, wherein the calculation processing unit generates the defective work signal based on the output measured value and the allowable range over a defect judging portion of the cycle.

7. A size checking apparatus comprising:

sensing means for sensing measured distances to a work moving on a transportation apparatus;

judging means for learning standard distances based on a function of the measured distances when the work is a standard work, and for checking the work against an allowable range when the work is a work to be tested, the judging means generating a defective work signal when the work is the work to be tested and the measured distances exceed limits of the allowable range; and computing means for reading the standard distances from the judging means and determining the allowable range.

8. A method for checking the size of a work, comprising the steps of:

transporting a plurality of standard works through a measuring apparatus;

measuring at a plurality of measurement positions across a feature of each of said plurality of standard works to obtain a set of data points for each measured positions;

establishing at each measurement position a maximum point, a minimum point and an average point, creating a maximum limit waveform by connecting the maximum points, a minimum limit waveform by connecting the minimum points and an average limit waveform by connecting the average points established at each measurement position;

selecting a critical position from said measurement positions;

calculating a standard deviation using the data points obtained from measuring the feature of the plurality of standard works at the critical position;

establishing an acceptable upper limit and an acceptable lower limit for a measured value on the basis of a multiple of the standard deviation above and below a one of the maximum limit, minimum limit and average waveforms;

transporting a production work to be measured at a constant speed;

generating a trigger signal when said production work encounters enters a measuring zone;

measuring the production work at a plurality of points to produce a plurality of measured values;

comparing the measured values against the acceptable upper limit and against the acceptable lower limit;

providing an indication of a defective work when a one of the measured values is a one of greater than the acceptable upper limit and less than the acceptable lower limit.

9. The method as claimed in claim 8, wherein each production work is transported in a single direction.

10. The method as claimed in claim 8, wherein the plurality of points are determined based upon a measurement time cycle.

11. The method as claimed in claim 8, wherein a measured area is divided into a plurality of areas each containing a sub-set of said plurality of points such that an area of said work that is defective can be detected.

* * * * *